United States Patent Office 3,002,815
Patented Oct. 3, 1961

3,002,815
PROCESS FOR THE PRODUCTION OF CHROMIUM TRIOXIDE
Gerhard Heinze, Leverkusen, Germany, assignor to Farbenfabriken Bayer Aktiengesellschaft, Leverkusen, Germany, a corporation of Germany
No Drawing. Filed July 1, 1959, Ser. No. 824,189
Claims priority, application Germany July 17, 1958
6 Claims. (Cl. 23—145)

The present invention relates to an improved process for the production of chromium trioxide.

Alkali metal dichromates are generally used as the initial materials to obtain chromium trioxide. The alkali metal chromate, for example sodium dichromate is reacted with an acid, usually sulphuric acid, in accordance with the reaction equation $$Na_2Cr_2O_7 + 2H_2SO_4 \rightarrow 2CrO_3 + 2NaHSO_4 + H_2O$$

This reaction can be carried out in accordance with the so-called "dry" process in the following manner: sodium dichromate crystals are mixed with sulphuric acid and this mixture is thereafter heated while stirring. After evaporating the water, the sodium bisulphate melts at about 170° C. and the chromium trioxide at 198° C. The molten chromium trioxide forms the bottom liquid layer and can easliy be separated out in pure form. The bisulphate, of which there are about 160 parts to 100 parts of chromium trioxide, is contaminated by trivalent and hexavalent chromium compounds and must be rejected or worked up by complicated means.

With the second method for the preparation of chromium trioxide, which is the so-called "wet" process, the initial material used is a sodium dichromate solution to which a large excess of sulphuric acid is added. The precipitated crude chromic acid is filtered off, washed and must still be recrystallised. The process is complicated and only provides moderate yields.

It is also known to combine these two methods of production. From an aqueous dichromate solution, a crude chromic acid is initially precipitated by adding a large excess of sulphuric acid and then it is filtered off. The crude product obtained by this method, which product still contains bisulphate and free sulphuric acid as well as water, is then melted down and purified from the impurities by layer separation. This process only proceeds satisfactorily, however, if no sulphuric acid or only a small quantity thereof is present in excess beyond the bisulphate stage.

A process is also known in which the disturbing excess sulphuric acid present in the wet crude chromic acid is neutralised by reaction with sodium dichromate. This process has the disadvantage that the addition of dichromate to crude chromic acid must be accurately adapted to the prevailing quantities and the changing content of free sulphuric acid therein. Prior to further processing, it is therefore necessary to analyse the crude chromic acid.

The present invention is concerned with a process for the production of chromium trioxide by reacting an alkali metal dichromate with sulphuric acid, this process consisting in that a mixture of the dichromate and water with about 1300 g. to about 1700 g. of dichromate (calculated as $Na_2Cr_2O_7.2H_2O$) per litre is reacted with sulphuric acid, advantageously in a 5–30% excess.

Under these conditions, a yield of about 80% crude chromic acid which is suitable for melting is obtained. It has surprisingly been found that a suspension of the dichromate crystals in a saturated dichromate solution can readily be reacted with sulphuric acid in a short time to form chromium trioxide, it being possible to manage with the theoretical quantity of acid. After the resulting crude chromic acid has been filtered off, it can be melted without after-treating and without supplying additives. The separation of the molten components, chromic acid and bisulphate, proceeds without difficulties. With this working method, only about 30 parts by weight of impure bisulphate to 100 parts by weight of chromium trioxide are found. The mother liquor formed with the filtration of the crude chromic acid and containing about 80% of the bisulphate as well as about 20% of the dichromate which is introduced, can usefully be employed for acidifying monochromate solutions for the manufacture of dichromate.

In carrying out the process, it is possible to proceed in such a way that sodium dichromate crystals are suspended in a saturated sodium dichromate solution and are reacted with sulphuric acid. It is however also possible to mix sodium dichromate crystals and water and add the sulphuric acid to this mixture. A third possibility also consists in adding sulphuric acid to a hot saturated sodium dichromate solution containing about 1600 to 1700 g./l. of $Na_2Cr_2O_7.2H_2O$. The addition of sulphuric acid is so controlled that 1.0 to 1.3 and preferably 1.1 mols of $H_2SO_4$ are added per mol of sodium. Temperatures between 60 and 100° C. have proved suitable as a working temperature for the reaction with the sulphuric acid. If the temperature is too low, bisulphate crystals are precipitated and contaminate the separated chromic acid. As a result, the proportion of bisulphate formed in the melting process increases. If the working temperatures are too high, undesirable reduction phenomena with the chromium compounds take place, and these cause the further processing in the manufacture of dichromate of the mother liquor formed by the filtration of the chromic acid to become difficult.

Example

The present invention is further illustrated by the following example without being restricted thereto.

1200 g. of $Na_2Cr_2O_7.2H_2O$ are suspended in 220 cc. of water. 490 cc. of 96% $H_2SO_4$ are slowly run into this suspension and the temperature rises to about 75° C. On completing the addition, the mixture is stirred for 10 minutes and then filtered while hot to obtain 919 g. of moist chromium trioxide with 70.2% of $CrO_3$. 695 cc. are formed as filtrate with 211 g. of $CrO_3$/l. The yield of chromium trioxide in the filter residue is 80.6%. The chromium trioxide purified by melting down contains 99.42% $CrO_3$, 0.17% $SO_3$ and 0.01% Cl.

I claim:
1. In a process for the production of chromium trioxide by reacting sodium dichromate with sulphuric acid, the step which comprises reacting a mixture of dichromate and water containing about 1300 g. to about 1700 g. of dichromate (calculated as $Na_2Cr_2O_7.2H_2O$) per litre with from 2 to 2.6 mols of sulphuric acid per mol of dichromate, and recovering the chromium trioxide formed from the resulting reaction mixture.

2. A process as claimed in claim 1, wherein a hot saturated solution of sodium dichromate is reacted with sulphuric acid.

3. A process as claimed in claim 1, wherein a mixture of about 1200 g. of $Na_2Cr_2O_7.2H_2O$ with about 220 g. of $H_2O$ is reacted with sulphuric acid.

4. A process according to claim 1 wherein said reacting is carried out at a temperature of from about 60 to 100° C.

5. A process according to claim 1 wherein the mixture of dichromate and water includes dichromate crystals suspended in saturated dichromate solution.

6. In a process for the production of chromium trioxide by reacting sodium dichromate and sulfuric acid in the presence of water, filtering the precipitated impure chromic acid contaminated with bisulfate, melting the said impure chromic acid and separating off the impure molten chromic acid depositing below a layer of molten bisulfate of lighter specific gravity, the step which comprises reacting sodium dichromate solution containing about 1300 g. to 1700 g. of dichromate (calculated as $Na_2Cr_2O_7 \cdot 2H_2O$) per liter and 1.0 to 1.3 mols of sulphuric acid per gram atom of sodium.

References Cited in the file of this patent

UNITED STATES PATENTS

| | | |
|---|---|---|
| 2,034,256 | Vetter | Mar. 17, 1936 |
| 2,632,688 | Perrin | Mar. 24, 1953 |